Figure 1:
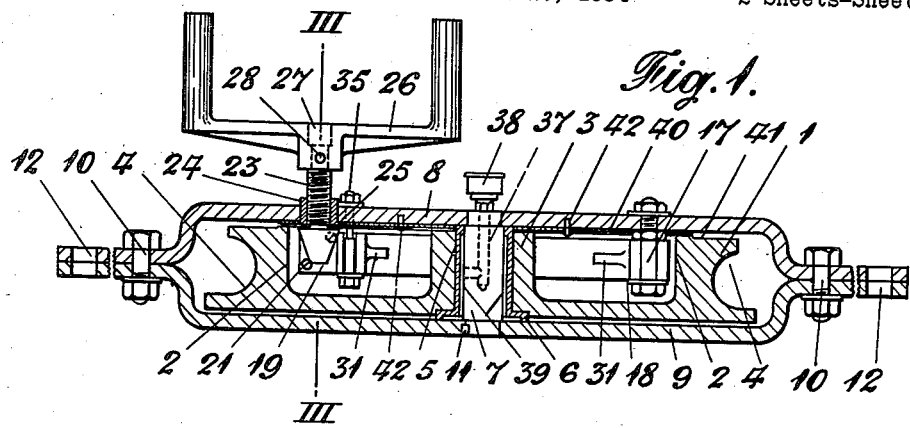

Jan. 12, 1937.     H. RICHFORD     2,067,343
BRAKE MECHANISM
Filed June 28, 1934    2 Sheets-Sheet 1

Inventor:
Herbert Richford
By his Attorneys:

Jan. 12, 1937. H. RICHFORD 2,067,343
BRAKE MECHANISM
Filed June 28, 1934 2 Sheets-Sheet 2

Inventor:
Herbert Richford
By his Attorneys: Pennie, Davis, Marvin & Edmonds

Patented Jan. 12, 1937

2,067,343

UNITED STATES PATENT OFFICE 2,067,343

BRAKE MECHANISM

Herbert Richford, Moston, Manchester, England

Application June 28, 1934, Serial No. 732,819
In Great Britain July 7, 1933

9 Claims. (Cl. 188—78)

This invention of an improvement in brake mechanism consists in a brake mechanism comprising a turnable member, braking members with oblique faces within the turnable member which are movable outwardly into and inwardly out of contact with the turnable member, conical wedging means to work between and against the oblique faces on the braking members and to turn with and to be moved axially by threaded operating means to turn about an axis parallel to that of the turnable member and to be worked by an operator by which the wedging means may be moved to effect outward movement of the braking members and may be held against allowing inward movement of the braking members from any position in which they may have been set and relatively stationary parts against which the braking members may bear by parts adjacent to the oblique faces on them respectively and so be sustained against being moved by the coned parts transversely to inward and outward movement.

The invention consists further in such a brake mechanism as aforesaid in which the braking members are made movable by contact with the turnable member so that in application of the braking members against the turnable member a Servo or self energizing action shall be brought about, and consists further in brake mechanism comprising features and constructions to be indicated in the description following and the claims appended to this specification.

The brake mechanism in which this invention consists has been devised primarily for checking or controlling or stopping the movement of a haulage or hoisting rope or chain in a mine or elsewhere but can be constructed in forms adapted for other uses.

One object of the invention is to provide a simple, easily operated and trustworthy brake mechanism in which a turnable member can be easily controlled or checked in revolution or held firmly against turning or can be released in order that it may be revolved freely and when held against turning shall remain so held without attention of an operator until intentional action is taken in order to release it.

Another object of the invention is to provide a transportable brake mechanism which comprising a pulley or block for receiving contact or engagement of a haulage or hoisting rope or chain in a mine or elsewhere and brake members for controlling or hindering the turning of the pulley or block or holding it against being turned, is adapted to be held by a rope or chain or ropes or chains or otherwise in position for use in a mine or elsewhere and presents the advantage that if an operator supervising the haulage or hoisting should perceive need to perform some operation in connection with things being hauled or hoisted, as for example, in the case of haulage in a mine, the replacement on rails of a derailed tub or wagon, he can set the brake members in position for checking or controlling the turning of the pulley or block or for holding it against turning as he may think desirable and may then perform the needed operation if practicable and afterwards set the pulley or block free again to be revolved and need not depend on signalling to a motor driver or person controlling the motor used for effecting haulage or hoisting that the interruption or resumption of a haulage or hoisting is needed.

A further object of the invention is to prevent the braking members of such a brake mechanism as aforesaid from being moved by or transmitting any strain other than that necessarily involved in the application of the braking members against the turnable member and resistance to the revolution of the turnable member.

A still further object of the invention is that the brake members of the brake mechanism shall be movable by contact with the turnable member so that in application of the braking members against the turnable member a Servo or self energizing action shall be brought about.

Further objects of the invention are set forth in the description following.

Figure 2:
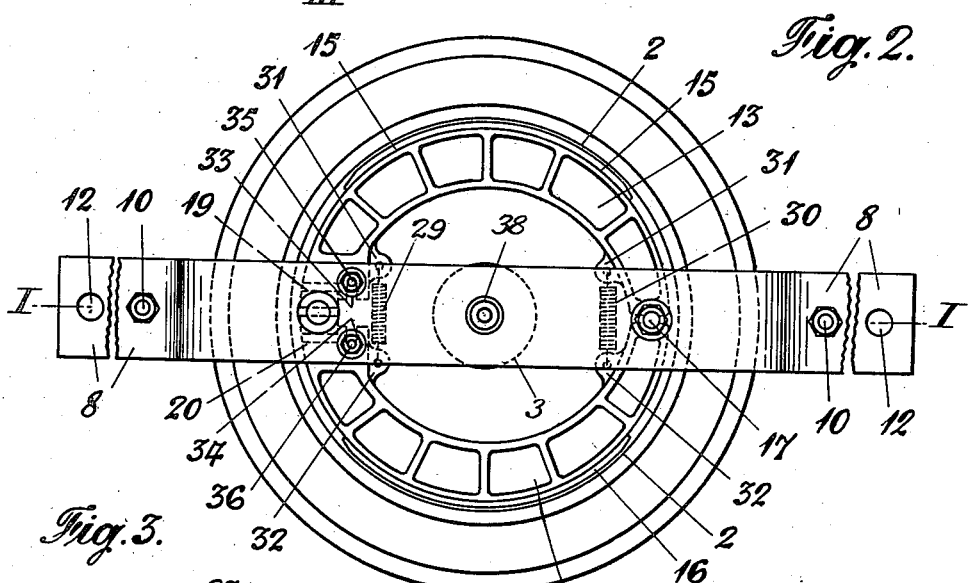
Figures 3, 4, 5:
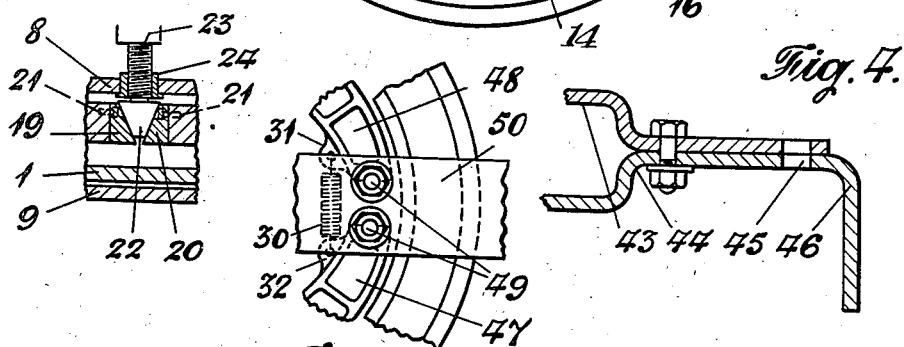
Figure 10:
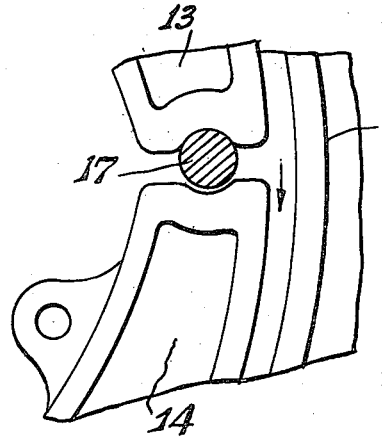
Figure 7:
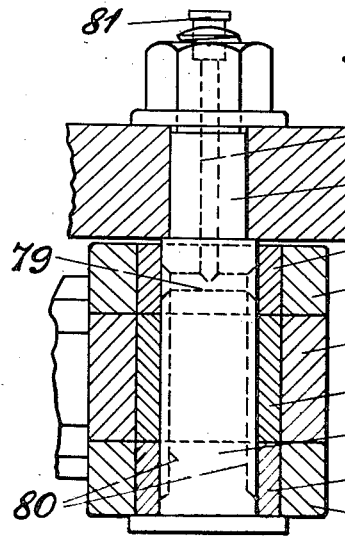
Figure 6:
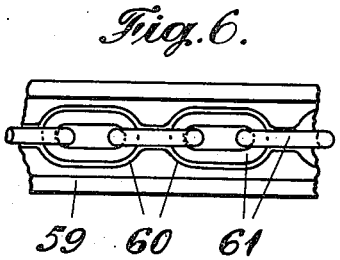
Figure 8:
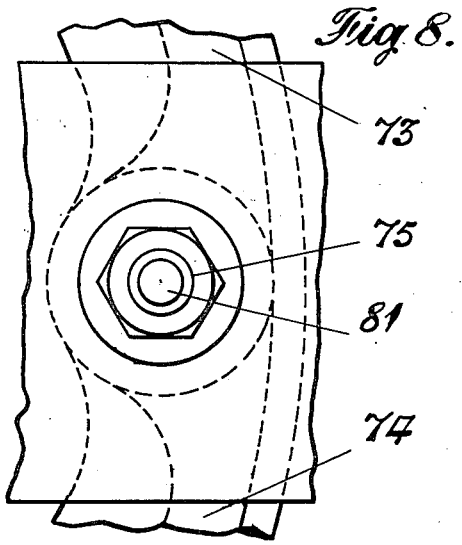
Figure 11:
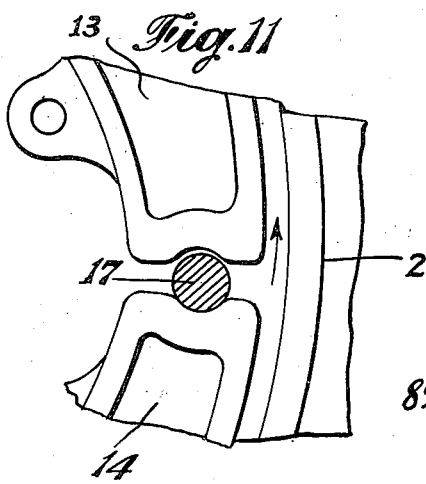
Figure 9:
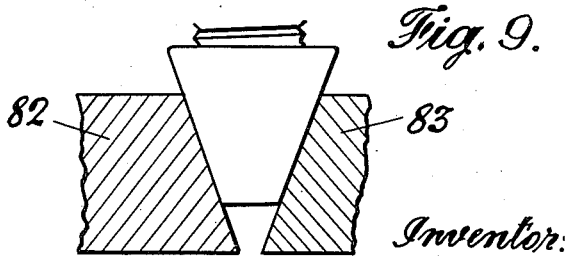

This invention is illustrated in the accompanying drawings in exemplificatory form. In the drawings, Fig. 1 is a longitudinal section through a brake mechanism taken on the plane indicated by the line II—II of Fig. 2. Fig. 2 is a plan of the brake mechanism omitting, for clearer representation of other parts, a cover plate shown in Fig. 1. Fig. 3 is a section taken on the plane indicated by the line III—III of Fig. 1. Fig. 4 is a section corresponding in part to part of Fig. 1 and showing a modified construction. Fig. 5 is a plan corresponding to part of Fig. 2 but showing a modified construction. Fig. 6 is a side view of part of a pulley or sheave formed as a chain wheel and with a chain in engagement with it. Fig. 7 is a section corresponding to part of Fig. 1 but drawn upon a larger scale showing still another modification. Fig. 8 is a plan corresponding to part of Fig. 2 and showing parts shown in Fig. 7. Fig. 9 is another section corresponding in many respects to Fig. 3 and showing another modification. Fig. 10 is a plan, partly in horizontal section, showing on a larger scale, part of one of the brake members illustrated in Fig. 2, and a stud forming a bearing for said brake member. Fig. 11 is a similar view showing part of the other brake member illustrated in Fig. 2, and a stud forming a bearing therefor.

The same characters of reference indicate corresponding parts in different figures of the drawings.

In the brake mechanism shown in Figs. 1, 2 and 3, 1 is a pulley or sheave formed on one face with an annular flange 2 surrounding an annular cavity around a central boss 3. The flange 2 internally is mainly of cylindrical curvature and externally is formed with a groove 4 to receive application of a haulage or hoisting rope and is so shaped that the circumference at one side of the groove 4 is larger than the circumference at the other side of the groove 4. A bush 5, which is mainly of a cylindrical external form and formed with a flange 6 at one end and a central hole, is secured in the center of the pulley or sheave 1. The bush 5 is mounted around a stud 7 with a central cylindrical part of larger diameter than other cylindrical parts at its ends which are fitted into holes in the central parts of two bars 8, 9 which are provided to form the carrier member or frame of the mechanism and are secured together by bolts 10 near their ends and between the places at which the bolts 10 are applied are shaped to present central parallel portions at a distance apart sufficient to allow the pulley or sheave 1 to be mounted and revolved between them and around the stud 7. In order that the stud 7 shall be secured against being turned, a screw 11 is made to engage screw threads formed in the sides of a hole formed in part in the stud 7 and in part in the bar 9. Near the ends of the bars 8, 9, holes 12 are formed for the passage of hooks or a chain or rope or chains or ropes or to receive holding pins grouted or otherwise fixed in the floor of a passage or other place in a mine or to receive other holding means for use in securing the frame formed by the bars 8, 9 in any position in which it may be requisite to secure it for the use of the brake mechanism. In the annular cavity surrounded by the flange 2 of the pulley or sheave 1 are applied two movable braking arms 13, 14 which each extend around an arc of a circle and for strength in proportion to their weight are of cellular formation providing inner and outer walls and a central web and cross or radial partitions or walls connecting them. Other formations of the braking arms 13, 14 are obviously possible in different cases. The braking arms 13, 14 on their outer faces are furnished with linings or facings 15, 16 respectively of suitable frictional material, for example that known by the trade mark "Ferodo" for contact with the inner circumference of the pulley or sheave 1 in the use of the brake mechanism. The brake linings or facings 15, 16 are applied in any appropriate manner, for example in the manner practiced in brakes for automobiles. The brake arms 13, 14 are each formed at one end as best shown in Figs. 10 and 11 with a groove in the form of a segment of a cylinder to fit against while being free to be moved radially through a little distance from and to the cylindrical circumference of a stud 17 which is furnished with a washer 18 to form bearing for one side of each brake arm 13, 14 and is screwed and secured by nuts in the bar 8. At their other ends the brake arms 13, 14 are furnished with attached blocks 19, 20 secured to them by screws 21 shown in the case of the block 19 in Fig. 1, each of which blocks 19, 20 is formed with an oblique face to be presented towards the corresponding face of the other and to receive contact of a conical wedge 22 provided to be forced in the direction of its axial or center line between the two blocks 19, 20 and to force them apart and so to move the one braking arm 13 away from the other 14. The conical wedge 22 is formed on a screw-threaded stem 23 mounted to be turned in a correspondingly screw-threaded bush 24 secured in the bar 8. The screw-threaded bush 24 is shown as made to fit tightly so as to be held in a hole in the bar 8 and is formed externally with a flange or shoulder 25 around one end to bear against the one face of the bar 8. The screw-threaded bush 24 is removable from the bar 8 so that when it is worn a new one may be put in its place and the blocks 19, 20 are also readily removable so that when they are worn new ones may be applied in their places. As an example of turning means which may be employed, the screwed stem 23 shown as formed at one end with a square part is furnished on the square part with a handle 26 which may be of any form convenient for operation; and, for example, is shown as a bar with hand grips at opposite ends and a central boss 27. The handle 26 is secured upon the stem 23 by means of a screw 28. By means of the handle 26 the screwed stem 23 may be turned in order that the conical wedge 22 may be made to force apart the blocks 19, 20 and so the adjacent opposed ends of the braking arms 13, 14 and to force the brake faces 15, 16 against the interior surface of the flange 2 of the pulley or sheave 1 or may be drawn back to allow the brake faces 15, 16 to be moved from the flange 2 of the pulley or sheave 1. Preferably the handle 26 is secured in such position upon the stem 23 that the central boss 27 arriving against the screw-threaded bush 24 will prevent the conical wedge 22 from being brought against the pulley or sheave 1 should the brake linings or facings 15, 16 become worn too thin for proper service. In one convenient way of fixing the handle 26 in such a position upon the stem 23 so that arriving against the bush 24 it will prevent the conical wedge 22 from being brought into contact with the pulley or sheave 1, the stem 23 is formed with only the extremity made square and left in that condition until the brake mechanism has been assembled with the exception of the application and securing of the handle 26 and the formation of the square part is completed after the stem 23 has been set so that the brake linings 15, 16 on the braking arms 13, 14 just leave the pulley or sheave 1 free to be revolved and the stem 23 is marked with a suitable indication of where the square part must end in order that when the handle 26 has been fixed upon the stem 23 screwing of the stem 23 into the bush 24 shall bring the boss 27 of the handle 26 into contact with the bush 24 before the conical wedge 22 touches the pulley or sheave 1. Two springs 29, 30 to work in tension and shown in dotted lines in Fig. 2 are provided for moving the braking arms 13, 14 and their braking faces 15, 16 away from the flange 2 of the pulley or sheave 1 and are engaged at their ends in holes in ears 31, 32 formed on the braking arms 13, 14. The spring 30 near the stud 17 serves also to hold the braking arms 13, 14 upon and to draw them towards the stud 17 while allowing them some freedom for movement away from the center line of the stud 17. The ends of the brake arms 13, 14 between which the conical wedge 22 is applied are formed with notched jaws or forks 33, 34 and adapted to pass at the sides of the shanks of studs 35, 36 screwed into the bar 8 and to bear against washers applied around and bearing against the heads of the studs 35, 36 so as to afford sustaining means or bearing for the braking arms 13, 14 and so to enable the conical wedge 22 though applying pressure transverse to the inward and outward movement of the braking members to be made to force the brake faces 15, 16 against the flange 2 of the pulley or sheave 1 without transmitting through the braking arms 13, 14 to the stud 17 strain other than that necessarily involved in the pressure of the brake surfaces 15, 16 against the flange 2 of the pulley or sheave 1 and the resistance to the turning of the pulley or sheave 1. The stud 7 is shown as formed with a passage 37 for lubricant leading from one end to a middle point or middle part of the circumference and is furnished at one end with a lubricator 38 by means of which lubricant may be forced through the passage 37.

The bush 5 is shown as formed in the wall of its central hole and in the flange 6 with grooves 39 to facilitate the passage of lubricant towards its ends and the circumference of the flange 6 between the bush 5 and parts against which it is made to turn in use. The flange 6 on the bush 5 is provided in order to provide a bearing surface sufficient for the use of the mechanism described with the pulley or sheave 1 made to revolve about an axis vertical or inclined and with the smaller external circumference at the upper side. A cover plate 40 shown in section in Fig. 1 is provided and made of circular form and of diameter sufficient to extend to the circumference of an adjacent circular surface formed around the flange 2 of the pulley or sheave 1 within a rabbet 41 therein and is secured to the bar 8 so as to be in proximity to the adjacent face of the pulley or sheave 1 and to hinder the access of dirt to the interior of the pulley or sheave 1 and parts within it. The cover plate 40 is secured to the bar 8 by screws 42 two of which are shown in Fig. 2.

When the brake mechanism shown in Figs. 1, 2 and 3 is secured in position for use, as for example by a rope or chain or ropes or chains passed through or engaged with the holes 12 in the bars 8, 9 or by the bars 8, 9 being applied by means of the holes 12 to pins grouted in the floor of a passage or place in a mine or is secured in position in any other way convenient or appropriate in any case and a haulage or hoisting rope is led around the pulley or sheave 1, it is easy by means of the conical wedge 22 worked by the screw-threaded stem 23 and handle 26 being turned in one direction or the other to allow free turning of the pulley or sheave 1 and passage to the rope revolving the pulley or sheave 1, or by means of the braking arms 13, 14 to check or hinder the revolution of the pulley or sheave 1, and the passage of the rope, or to hold the pulley or sheave 1 against being turned by the rope and the rope against movement. As the handle 26 will remain in any position into which it may be left after being turned, an operator without needing to signal to a driver or person in charge of a haulage or hoisting motor that a stoppage of hauling or hoisting is needed can check or stop the revolution of the pulley or sheave 1 for any reason and then attend to any operation intended or practicable, as for instance the replacement on rails of derailed mine tubs or wagons and when ready to do so can set the pulley or sheave 1 again free to be revolved and the rope to be moved. In the brake mechanism shown in Figs. 1, 2 and 3, the braking arms 13, 14 while held by the spring 30 and by the flange 2 of the pulley or sheave 1 against becoming dislodged from the stud 17 are capable of slight movement radially in relation to it and so when the brake surface 15 or 16 on one or other braking arm 13 or 14 is in contact with the flange 2 of the pulley or sheave 1 moving in one direction or the other, the braking arm 13 or 14 will tend to move and bring the brake face 15 or 16 into closer contact with the flange 2 so that a servo or self energizing action is brought about.

A modification of the formation of the bars forming the carrier member or framework of the brake mechanism is shown in Fig. 4, in which two bars 43, 44 formed with holes 45, only one of which is shown, corresponding to the holes 12 shown in Figs. 1 and 2 and in other respects generally corresponding to the bars 8, 9 shown in Figs. 1, 2 and 3 are employed and the bar 44 is formed at each end with an extension 46 extending from it at right-angles available as a support which standing on the floor of a mine gallery or elsewhere may serve as a support for the brake mechanism in position for use. Only one end of each bar 43, 44 is shown but the opposite ends are similar. The carrier member or framework constructed as illustrated in Fig. 4 may be secured in position for use similarly to that shown in Fig. 3.

Fig. 5 shows a construction in which two braking arms 47, 48 corresponding generally to the braking arms 13, 14 shown in Figs. 1, 2 and 3 are made to bear by grooved ends against separate studs 49 secured in a bar 50 corresponding to the bar 8 shown in Figs. 1, 2 and 3.

In Fig. 6 a pulley or sheave 59 shown only in part and corresponding in other respects to the pulley or sheave 1 shown in Figs. 1, 2 and 3 is shown, which is formed as a chain wheel which is formed in its periphery with recesses 60 to correspond with links of a chain and so is adapted to receive engagement of a chain 61 passed around it in order by engagement with the chain links to hinder or control the chain 61 in movement or to hold it against turning according as the pulley or sheave 59 is hindered or stopped from being revolved.

Figs. 7 and 8 show a construction in which two brake arms 73, 74, similar in other respects to the arms 13, 14 shown in Figs. 1, 2 and 3, are made to surround the stud 75 about which they are to be moved in use. The one brake arm 73 is forked so as at one end to receive one end of the other arm 74 as in what is commonly called a knuckle-joint and two bearing bushes 76 are provided in the arm 73 and one bearing bush 77 is provided in the arm 74 to bear against the stud 75. The stud 75 is shown formed with a central longitudinal hole 78 in communication by a transverse hole 79 with longitudinal grooves 80 in the surface of the stud 75 so that lubricant may be applied to the stud 75 and the bearings of the arms 73, 74. A removable plug 81 is shown screwed into a screw-threaded part of the central hole 78 to close it against access of dirt. The brake arms 73, 74 in the construction shown in Figs. 7 and 8, being incapable of radial movement in relation to the stud 75 do not afford the servo or self energizing action which occurs in the use of the mechanism shown in Figs. 1, 2 and 3 and the mechanism illustrated by Fig. 5.

While it is very advantageous and preferred according to this invention that for contact of the wedging means there should be provided on the braking arms employed blocks such as the blocks 19 and 20 which are removable from the arms so that when they become worn new ones can readily be applied in place of them, it is nevertheless practicable if it be desirable in any case to provide braking arms which are themselves formed with the faces for receiving contact of the wedging means, and by way of example Fig. 9 shows two arms 82, 83 so formed but otherwise similar to the braking arms 13, 14 shown in Figs. 1, 2 and 3 and the others hereinbefore described.

Referring to Fig. 10, it will be seen that a slight clearance (exaggerated in the figure) is provided between the stud 17 and the grooved end-face of the arm 14, which, in the absence of the spring 30, would be dragged to the extent of this clearance, by reason of its engagement with the internal face of the pulley 1, in the direction of the arrow. With the pulley rotating in the direction of the arrow, the grooved end face of the arm 13 is dragged against the stud 17.

In Fig. 11, in which the pulley 2 is assumed to be rotating in counter-clockwise direction as indicated by the arrow, a clearance is shown between the grooved end-face of the arm 13 and the stud 17.

As will be understood from Fig. 2, the spring 30 opposes radial movement of the braking arms 13, 14.

It is obvious and to be understood that the brake mechanisms shown in the accompanying drawings or constructed according to this invention may be applied for use in many different ways according to the circumstances in which the brake mechanism is to be used, as for example either by being held by a rope or chain or ropes or chains or by being held against or secured to props or pit roof supports or other abutments or holding means in a mine or elsewhere, and that in place of a carrier member formed of bars, any other form of carrier member appropriate may be provided for carrying parts shown and hereinbefore described as mounted in the bars shown in the drawings as may be convenient in the case of any mechanism and instead of a handle, other turning means appropriated, for example means for remote control, may be provided.

From the foregoing description it will be understood that the invention provides brake mechanism simple, advantageous and trustworthy, applicable for controlling haulage or hoisting in mines or elsewhere and for a variety of other uses by simple modification of the parts forming the framework of the mechanism.

What I do claim as my invention and desire to secure by Letters Patent is:—

1. A brake mechanism comprising a carrier member, a turnable member carried by said carrier member, braking members within the turnable member which are movable outwardly into and inwardly out of contact with the turnable member and are adapted to bear against bearing means and to be moved about their bearing thereon and are also provided with oblique faces and adjacent to the oblique faces on them respectively are formed with bearing parts to bear on sustaining means, turnable conical wedging means for moving said braking means outwardly, applied for action between the opposed oblique faces on the braking members, and turnable in connection with screw-threaded operating means turnable for use in moving said conical wedging means in the direction of the center line thereof and parallel to the center line of said turnable member on the carrier member, and in turning said conical wedging means, means for turning said screw-threaded operating means, bearing-means for said screw-threaded operating means provided in said carrier member, bearing means also provided in said carrier member providing bearing on which said braking members may be moved, and sustaining means in said carrier member for sustaining the braking members at parts adjacent to the oblique faces against movement under pressure of the conical wedging means transverse to the outward and inward movement of said braking members.

2. A brake mechanism comprising a carrier member, a turnable member carried by said carrier member, braking members within the turnable member which are movable outwardly into and inwardly out of contact with the turnable member and are adapted to bear against and to be moved about bearing means and are also provided with oblique faces and adjacent to the oblique faces on them respectively are formed with bearing parts to bear on sustaining means, conical wedging means for moving said braking means outwardly, applied for action between the opposed oblique faces on the braking members, and in connection with screw-threaded operating means turnable for use in moving said conical wedging means in the direction of the center line thereof and parallel to the center line of said turnable member, means for turning said screw-threaded operating means, bearing-means for said screw-threaded operating means provided in said carrier member, bearing means also provided in said carrier member providing bearing about which said braking members may be moved, spring means opposing radial movement of said braking members relatively to said last-mentioned bearing means, and sustaining means in said carrier member for sustaining the braking members at parts adjacent to the oblique faces against movement under presure of the conical wedging means transverse to the outward and inward movement of said braking members.

3. A brake mechanism comprising a carrier member, a turnable member carried by said carrier member, braking members within the turnable member which are movable outwardly into and inwardly out of contact with the turnable member and are adapted to bear against bearing means each at one end and near the opposite ends are formed respectively with bearing parts to bear on sustaining means and are adapted to receive blocks secured to said braking members, respectively, blocks with oblique faces secured on said braking members and provided with oblique faces and applied on said braking members to present opposed oblique faces, conical wedging means for moving said braking means outwardly, in connection with turnable screw-threaded operating means for use in moving said conical wedging means in the direction of the center line thereof and parallel to the center line of said turnable member and applied betwen the opposed oblique faces of the blocks on the braking members, means for turning said screw-threaded operating means, bearing means for said screw-threaded operating means provided in said carrier member, bearing means also provided in said carrier member providing bearing on which said braking members may be moved, and sustaining means in said carrier member for sustaining the braking members at parts adjacent to the blocks with oblique faces against movement under pressure of the conical wedging means transverse to the outward and inward movement of said braking members.

4. A brake mechanism comprising a carrier member, a turnable member carried by said carrier member, braking members within the turnable member which are movable outwardly into and inwardly out of contact with the turnable member and are adapted to bear against and to be moved about bearing means each at one end and near the opposite ends are formed respectively with bearing parts to bear on sustaining means and are adapted to receive blocks secured to said braking members, respectively, blocks with oblique faces secured on said braking members and provided with oblique faces and applied on said braking members to present opposed oblique faces, conical wedging means for moving said braking means outwardly, in connection with turnable screw-threaded operating means for use in moving said conical wedging means in the direction of the center line thereof and parallel to the center line of said turnable member and applied between the opposed oblique faces of the blocks on the braking members, means for turning said screw-threaded operating means, bearing-means for said screw-threaded operating means provided in said carrier member, bearing means also provided in said carrier member about which said braking members may be moved angularly, spring means opposing radial movement of said braking members relatively to said last-mentioned bearing means, and sustaining means in said carrier member for sustaining the braking members at parts adjacent to the blocks with oblique faces against movement under pressure of the conical wedging means transverse to the outward and inward movement of said braking members.

5. A brake mechanism comprising a carrier member, a turnable member carried by said carrier member, braking members within the turnable member which are movable outwardly into and inwardly out of contact with the turnable member and are adapted to bear against bearing means and to be moved about their bearing thereon and are provided with opposed oblique faces and adjacent to the oblique faces are formed with bearing parts to bear on sustaining means, a screw-threaded turnable stem turnable about a center line parallel to the center line of said turnable member and formed with a cone forming wedging means applied for action between the opposed oblique faces on the braking members for moving said braking members outwardly, means for turning said screw-threaded stem, provided in said carrier member, bearing means also provided in said carrier member providing bearing on which said braking members may be moved, and sustaining means in said carrier member for sustaining the braking members at parts adjacent to the oblique faces against movement under pressure of the cone transverse to the outward and inward movement of said braking members.

6. A brake mechanism comprising a carrier member, a turnable member carried by said carrier member, braking members within the turnable member, which are movable outwardly into and inwardly out of contact with the turnable member and are provided at opposed ends with opposed oblique faces and adjacent to the oblique faces are formed with bearing parts to bear on sustaining means and are also formed with grooves at their other ends, a screw-threaded turnable stem turnable about a center line parallel to the center line of said turnable member and formed with a cone forming wedging means applied for action between the opposed oblique faces on the braking members for moving said braking members outwardly, means for turning said screw-threaded stem, screw-threaded bearing means for said screw-threaded stem provided in said carrier member, bearing means also in said carrier member providing bearing for the grooved ends of said braking members, spring means opposing radial movement of the grooved ends of said braking members away from said last-mentioned bearing means and sustaining means in said carrier member for sustaining the braking members at parts adjacent to the oblique faces against movement under pressure of the cone transverse to the outward and inward movement of said braking members.

7. A brake mechanism comprising a carrier member, a turnable member carried by said carrier member, breaking members within the turnable member which are movable outwardly into and inwardly out of contact with the turnable member and are adapted to bear at one end against bearing means and to be moved about their bearing thereon and at their other ends are adapted to receive blocks and adjacent to such other ends are formed with bearing parts to bear on sustaining means, blocks with oblique faces secured on said braking members to present oblique faces opposed, a screw-threaded turnable stem turnable about a center line parallel to the center line of said turnable member and formed with a cone forming wedging means applied for action between the opposed oblique faces of the blocks on the braking members for moving said braking members outwardly, means for turning said screw-threaded stem, screw-threaded bearing means for said screw-threaded stem, provided in said carrier member, bearing means also provided in said carrier member providing bearing about which said braking members may be moved, and sustaining means in said carrier member for sustaining the braking members at parts adjacent to the blocks thereon against movement under the pressure of the cone transverse to the outward and inward movement of said braking members.

8. A brake mechanism comprising a carrier member, a turnable member carried by said carrier member, braking members within the turnable member which are movable outwardly into and inwardly out of contact with the turnable member and are adapted at one end of each to receive blocks and adjacent to that end of each are formed with bearing parts to bear on sustaining means and are at their other ends formed with grooves, blocks with oblique faces secured on said braking members to present oblique faces opposed, a screw-threaded turnable stem turnable about a center line parallel to the center line of said turnable member and formed with a cone forming wedging means applied for action between the opposed oblique faces of said blocks for moving said braking members outwardly, means for turning said screw-threaded stem, screw-threaded bearing means for said screw-threaded stem, provided in said carrier member, bearing means also in said carrier member, providing bearing for the grooved ends of said braking members, spring means opposing radial movement of the grooved ends of said braking members, away from said last-mentioned bearing means, and sustaining means in said carrier member for sustaining the braking members at parts adjacent to the blocks thereon against movement transverse to the inward and outward movement of said braking members.

9. A brake mechanism comprising a carrier member, a turnable member carried by said carrier member, braking members within the turnable member which are movable outwardly into and inwardly out of contact with the turnable member and are adapted to bear against bearing means and to be moved about their bearing thereon and are also provided with oblique faces and adjacent to the oblique faces on them respectively are formed with bearing parts to bear on sustaining means, rotatable conical wedging means for moving said braking means outwardly, applied for action between the opposed oblique faces on the braking members, and in connection and rotatable with screw-threaded operating means turnable for use in moving said conical wedging means in the direction of the center line thereof and parallel to the center line of said turnable member and in turning said conical wedging means, means for turning said screw-threaded operating means, bearing means for said screw-threaded operating means provided in said carrier member, bearing means also provided in said carrier member providing bearing on which said braking members may be moved, and sustaining means in said carrier member for sustaining the braking members at parts adjacent to the oblique faces against movement under pressure of the conical wedging means transverse to the outward and inward movement of said braking members.

HERBERT RICHFORD.